United States Patent
Yu et al.

(10) Patent No.: US 12,017,927 B2
(45) Date of Patent: Jun. 25, 2024

(54) METHOD FOR PREPARING NICKEL SULFATE USING LOW-NICKEL FERRONICKEL

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yingsheng Zhong, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/555,735

(22) PCT Filed: May 27, 2022

(86) PCT No.: PCT/CN2022/095685
§ 371 (c)(1),
(2) Date: Oct. 17, 2023

(87) PCT Pub. No.: WO2023/010974
PCT Pub. Date: Feb. 9, 2023

(65) Prior Publication Data
US 2024/0083768 A1   Mar. 14, 2024

(30) Foreign Application Priority Data
Aug. 3, 2021   (CN) .......................... 202110886822.4

(51) Int. Cl.
*C01G 53/10*   (2006.01)
*C22B 3/00*   (2006.01)

(52) U.S. Cl.
CPC ............ *C01G 53/10* (2013.01); *C22B 23/043* (2013.01); *C01P 2004/03* (2013.01); *C01P 2006/80* (2013.01)

(58) Field of Classification Search
None
See application file for complete search history.

(56) References Cited

U.S. PATENT DOCUMENTS 3,847,594 A * 11/1974 Van Der Meulen .... C22B 7/002
423/632

FOREIGN PATENT DOCUMENTS

| CN | 104561552 A | 4/2015 |
| CN | 106829907 A * | 6/2017 ........... C01B 25/375 |

(Continued)

OTHER PUBLICATIONS

English translation of CN-106829907-A Description (Year: 2017).*
(Continued)

*Primary Examiner* — Anthony J Zimmer
*Assistant Examiner* — Zachary John Baum
(74) *Attorney, Agent, or Firm* — Yue (Robert) Xu; Apex Attorneys at Law, LLP

(57) ABSTRACT

The present invention relates to a method for preparing nickel sulfate using low-nickel ferronickel is disclosed. The method comprises the following steps: (1) grinding ferronickel to obtain ferronickel powder, and then sintering the ferronickel powder with an oxidant to prepare ferronickel oxide powder; (2) adding sulfuric acid to the ferronickel oxide powder prepared in step (1), mixing, heating, and washing with water to prepare a sulfate salt water washing solution; (3) adding a base to the sulfate salt water washing solution prepared in step (2) to adjust the pH value, then adding a fluoride salt to form a precipitate, filtering to remove the precipitate, and drying the filtrate to obtain nickel sulfate. The method provided in the present invention can improve the efficiency of preparing nickel sulfate, reduce the loss of nickel, and prepare nickel sulfate with high purity, the content of Ni potentially reaching 19.73%-21.34%.

7 Claims, 2 Drawing Sheets

(56) References Cited

FOREIGN PATENT DOCUMENTS

| | | | | |
|---|---|---|---|---|
| CN | 107673415 A | | 2/2018 | |
| CN | 109205687 A | | 1/2019 | |
| CN | 109609754 A | * | 4/2019 | ............ C01B 19/02 |
| CN | 111498918 A | * | 8/2020 | ............ B22F 1/0088 |
| CN | 111498918 A | | 8/2020 | |
| CN | 112941314 A | | 6/2021 | |
| CN | 113044821 A | | 6/2021 | |
| CN | 113184821 A | * | 7/2021 | ........... C01B 25/375 |
| CN | 113800578 A | | 12/2021 | |
| JP | 6539922 B1 | | 7/2019 | |
| KR | 20200000275 A | * | 1/2020 | ............ C01G 53/10 |
| WO | WO-0222896 A1 | * | 3/2002 | ......... C22B 23/0453 |

OTHER PUBLICATIONS

English translation of KR-20200000275-A Description (Year: 2020).*
English translation of CN-109609754-A Description (Year: 2019).*
English translation of CN-113184821-A Description (Year: 2021).*
English translation of CN-111498918-A Description (Year: 2020).*
International Search Report for PCT/CN2022/095685 mailed Aug. 26, 2022, ISA/CN.

* cited by examiner

METHOD FOR PREPARING NICKEL SULFATE USING LOW-NICKEL FERRONICKEL

This application is the national phase of International Application No. PCT/CN2022/095685, titled "METHOD FOR PREPARING NICKEL SULFATE USING LOW-NICKEL FERRONICKEL", filed on May 27, 2022, which claims the priority to Chinese Patent Application No. 202110886822.4, titled "METHOD FOR PREPARING NICKEL SULFATE USING LOW-NICKEL FERRONICKEL", filed on Aug. 3, 2021 with the China National Intellectual Property Administration, which are incorporated herein by reference in entirety.

FIELD

The present disclosure relates to the technical field of lithium battery raw material synthesis, specifically to a method for preparing nickel sulfate using low-nickel type ferronickel.

BACKGROUND

As a very important metal resource, nickel has a wide range of uses in, for example, steel magnetization, hydrogen energy storage, ceramic refining, nickel-containing stainless steel, especially in the manufacture of ternary lithium battery materials, high-nickel ternary lithium battery materials are one of the important materials. At present, nickel is an indispensable metal for the production of nickel sulfate, and nickel sulfate is regarded as one of the raw materials for the synthesis of lithium battery positive electrode materials. Therefore, nickel is considered as the core metal for the production of lithium batteries, and is of great significance for the development of new energy vehicles. Metallic nickel mainly comes from nickel sulfide ore and laterite nickel ore, and laterite nickel ore is more abundant. According to the composition of ore, deposits of laterite nickel ore can be divided into 3 deposits: limonite deposits, sapropel deposits, and transition deposits. The laterite nickel ore with limonite deposits belongs to the low-nickel type laterite nickel ore, in which the iron content can reach 30-55%, silicon dioxide accounts for about 10-30%, magnesium oxide accounts for about 0.1-5%, cobalt accounts for about 0.1-0.3%, and nickel only accounts for 0.2-1.5%. Low-nickel laterite nickel ore is smelted to obtain low-nickel type ferronickel. The feature of this kind of ferronickel is that in addition to low nickel content (<15%), the content of other metals such as iron, aluminum and magnesium is very high. The content of chemical elements varies greatly, and the composition of metals is complex and changeable. Therefore, if the traditional method is used in direct acid leaching of ferronickel to prepare a nickel sulfate solution, the content of nickel in the obtained solution is low, and the content of impurities such as iron, cobalt, and magnesium is high. In order to ensure the quality of nickel sulfate products, it is necessary to carry out multiple nickel enrichment, deep purification and impurity removal treatments on ferronickel. The treatment process is complicated and such treatment steps require a large amount of reagents, which will also cause a large amount of nickel loss, and still fail to guarantee the purity of nickel sulfate.

Therefore, there is an urgent need to provide a method for preparing nickel sulfate using low-nickel type ferronickel, which can improve the preparation efficiency, reduce the loss of nickel, and improve the purity of the nickel sulfate.

SUMMARY

The present disclosure aims to solve at least one of the technical problems existing in the above-mentioned prior art. For this reason, the present disclosure proposes a method for preparing nickel sulfate using low-nickel type ferronickel, which can improve the preparation efficiency, reduce the loss of nickel, and improve the purity of the nickel sulfate.

Inventive concept: In the present disclosure, ferronickel is sintered to prepare ferronickel oxide powder, and then sulfuric acid was added for heating and reaction. By dehydration reaction of iron oxide in high temperature and high concentration sulfuric acid, only a small part (<10%) of iron oxide will be selectively dissolved, and most of the remaining iron oxide will not dissolve, which can greatly reduce the workload of subsequent iron removal, improve the efficiency of impurity removal, and increase the purity of nickel; for other metals (Mg, Co, Ca, etc.), after dissolution, they are removed by adding fluoride salt and an extractant to obtain nickel sulfate with high purity.

The present disclosure provides a method for preparing nickel sulfate using low-nickel type ferronickel.

Specifically, a method for preparing nickel sulfate using low-nickel type ferronickel comprises the following steps:
(1) grinding ferronickel to obtain ferronickel powder, and then sintering the ferronickel powder in the presence of an oxidant to prepare ferronickel oxide powder;
(2) adding sulfuric acid to the ferronickel oxide powder prepared in step (1), mixing, heating, and washing with water to prepare a sulfate water wash liquid;
(3) adding alkali to the sulfate water wash liquid prepared in step (2) to adjust the pH value, then adding fluoride salt to form a precipitate, performing filtration to remove the precipitate, and drying the filtrate to obtain nickel sulfate.

Preferably, in step (1), the particle size of the ferronickel powder is less than 200 μm; more preferably, the particle size of the ferronickel powder is less than 150 μm.

Preferably, step (1) further comprises adding ammonium sulfate during the grinding.

The ammonium sulfate has a dual effect, which can be used as a grinding aid or an activator. Specifically, the ammonium sulfate is used as a grinding aid and is co-ground with the ferronickel, causing surface and internal modifications of the ferronickel particles, reflected mainly in changes in the apparent morphology and crystal structure of the ferronickel, so that the particles are more easily to break, and the ferronickel powder is easier to refine, which can increase the specific surface area and increase the contact with acid, which is beneficial to the dissolution of the ferronickel powder with sulfuric acid. At the same time, as an activator also, ammonium sulfate can reduce the inhibitory effect during the reaction of nickel and sulfuric acid, have the effect of activating the dissolution of ferronickel powder, increase the dissolution rate of ferronickel powder and sulfuric acid, and increase the recovery rate of nickel in a high temperature environment; also, the ammonium ion will volatilize at high temperature and will not affect the subsequent process.

Preferably, the mass of the ammonium sulfate is 0.3%-2% of the mass of the ferronickel; more preferably, the mass of the ammonium sulfate is 0.5%-1% of the mass of the ferronickel.

Preferably, in step (1), the oxidant is selected from one of air, $O_2$ and $H_2O_2$.

Preferably, in step (1), the temperature of the sintering is 700-1100° C., and the time of the sintering is 60-200 min; more preferably, the temperature of the sintering is 900-1000° C., and the time of the sintering is 120-180 min.

Preferably, in step (1), the pressure of the sintering is 0.10-0.55 MPa.

Preferably, the process of step (2) comprises: adding sulfuric acid to part of the ferronickel oxide powder prepared in step (1) and mixing them to obtain slurry A; then performing a first heating to the slurry A, adding part of the ferronickel oxide powder prepared in step (1) to the slurry A to obtain slurry B, performing a second heating and washing with water to obtain a sulfate water wash liquid.

By means of adding ferronickel oxide powder in batches and heating at a high temperature twice, the dissolution of nickel can be increased, such that more nickel can be dissolved to become nickel sulfate. Besides, adding ferronickel oxide powder in batches and heating in batches can also reduce impurities and improve the purity of nickel sulfate.

Preferably, in the slurry A, the ratio of the mass of the ferronickel oxide powder to the volume of the sulfuric acid is 1 kg:(4-15) L; more preferably, the ratio of the mass of the ferronickel oxide powder to the volume of the sulfuric acid is 1 kg:(4-8) L.

Preferably, in the slurry B, the ratio of the mass of the ferronickel oxide powder to the volume of the sulfuric acid is 1 kg:(1-3) L; more preferably, the ratio of the mass of the ferronickel oxide powder to the volume of the sulfuric acid is 1 kg:(1-2) L.

Preferably, the concentration of the sulfuric acid is 4-12 mol/L; more preferably, the concentration of the sulfuric acid is 4-8 mol/L.

Preferably, the temperature of the first heating is 300-500° C., and the time of the first heating is 10-60 min; more preferably, the temperature of the first heating is 350-420° C., and the time of the first heating is 20-40 min.

Preferably, the temperature of the second heating is 600-800° C., the time of the second heating is 10-60 min; more preferably, the temperature of the second heating is 650-760° C., and the time of the second heating is 20-40 min.

The temperature of the first heating and the second heating also has an important effect on the dissolution of nickel and the improvement of nickel purity. When the temperature of the first heating is not between 300-500° C. or the temperature of the second heating is not between 600-800° C., it will have a certain impact on the dissolution of nickel and iron, which will affect the purity of nickel and cause the loss of nickel.

Preferably, the water washing process is hot water washing. More preferably, the temperature of the hot water is 50-100° C.

Preferably, in step (3), the pH value is 3.5-5.5.

Preferably, in step (3), the ratio of the molar weight of the fluoride salt to the total molar weight of $Ca^{2+}$ and $Mg^{2+}$ in the sulfate water wash liquid is (1.2-1.5):1.

Preferably, in step (3), the metal ions in the fluoride salt are the same as those in the alkali.

Preferably, in step (3), before drying the filtrate, an extractant is added to perform extraction to obtain a raffinate phase and a nickel-loaded organic phase, and then the nickel-loaded organic phase is back-extracted by sulfuric acid to obtain nickel sulfate.; the volume ratio of the extractant to the filtrate is (0.5-3):(1-2); more preferably, the volume ratio of the extractant to the filtrate is (0.8-1.5):(1-1.5).

Preferably, the time of the extraction is 3-20 min; more preferably, the time of the extraction is 3-10 min.

Preferably, the extractant comprises sodium dodecyl sulfate, bis(2,4,4-trimethylpentyl) dithiophosphonic acid, tributyl phosphate, and sulfonated kerosene.

The content of metals such as Fe, Co, and Al in the filtrate varies greatly, and the corresponding separation coefficient is high, which makes it difficult to effectively separate nickel. The present disclosure uses an extractant obtained through the compounding of various components, sodium dodecyl sulfate, bis(2,4,4-trimethylpentyl) dithiophosphonic acid, tributyl phosphate and sulfonated kerosene as the main components of the extractant, and multiple metal impurities can be removed at the same time after only 1-2 extractions, thereby saving processes and reducing production costs.

Preferably, the volume ratio of sodium dodecyl sulfate, bis(2,4,4-trimethylpentyl) dithiophosphonic acid, tributyl phosphate, and sulfonated kerosene is (1-10):(5-20):(1-10):(60-90); more preferably, the volume ratio of sodium dodecyl sulfate, bis(2,4,4-trimethylpentyl) dithiophosphonic acid, tributyl phosphate, and sulfonated kerosene is (2-10):(5-20):(1-8):(65-85).

Preferably, step (3) further comprises a saponification process of the extractant and a process of adjusting the pH value of the filtrate before adding the extractant. More preferably, in the saponification process, the saponification rate of the extractant reaches 35-50%, and the time of the saponification is 30-60 min; the pH value of the filtrate is adjusted to 1.5-3.5.

Compared with the prior art, the present disclosure has the following beneficial effects:

(1) In the method for preparing nickel sulfate using low-nickel type ferronickel provided by the present disclosure, ferronickel is sintered first, then sulfuric acid is added for heating and reaction, and fluoride salt and an extractant are used, which can make full use of the dehydration reaction of iron oxide in high temperature and high concentration sulfuric acid, so that only a small part (<10%) of iron oxide can be selectively dissolved, reducing the workload of subsequent iron removal and improving the efficiency of impurity removal; by optimizing the process steps and selecting the extractant, the present disclosure can greatly improve the impurity removal efficiency and reduce the loss of nickel.

(2) The method provided by the present disclosure can prepare nickel sulfate using low-nickel type ferronickel. The purity of nickel sulfate is relatively high, and the content of Ni can reach 19.73%-21.34%. The method has simple operation and high preparation efficiency.

DETAILED DESCRIPTION

In order to make the technical solutions of the present disclosure more clearly understood by those skilled in the art, the following examples are listed for description. It should be pointed out that the following examples do not limit the scope of protection claimed in the present disclosure.

Unless otherwise specified, the components, reagents or devices used in the following examples can be obtained from conventional commercial channels, or can be obtained by existing known methods.

Example 1

Figure 1:
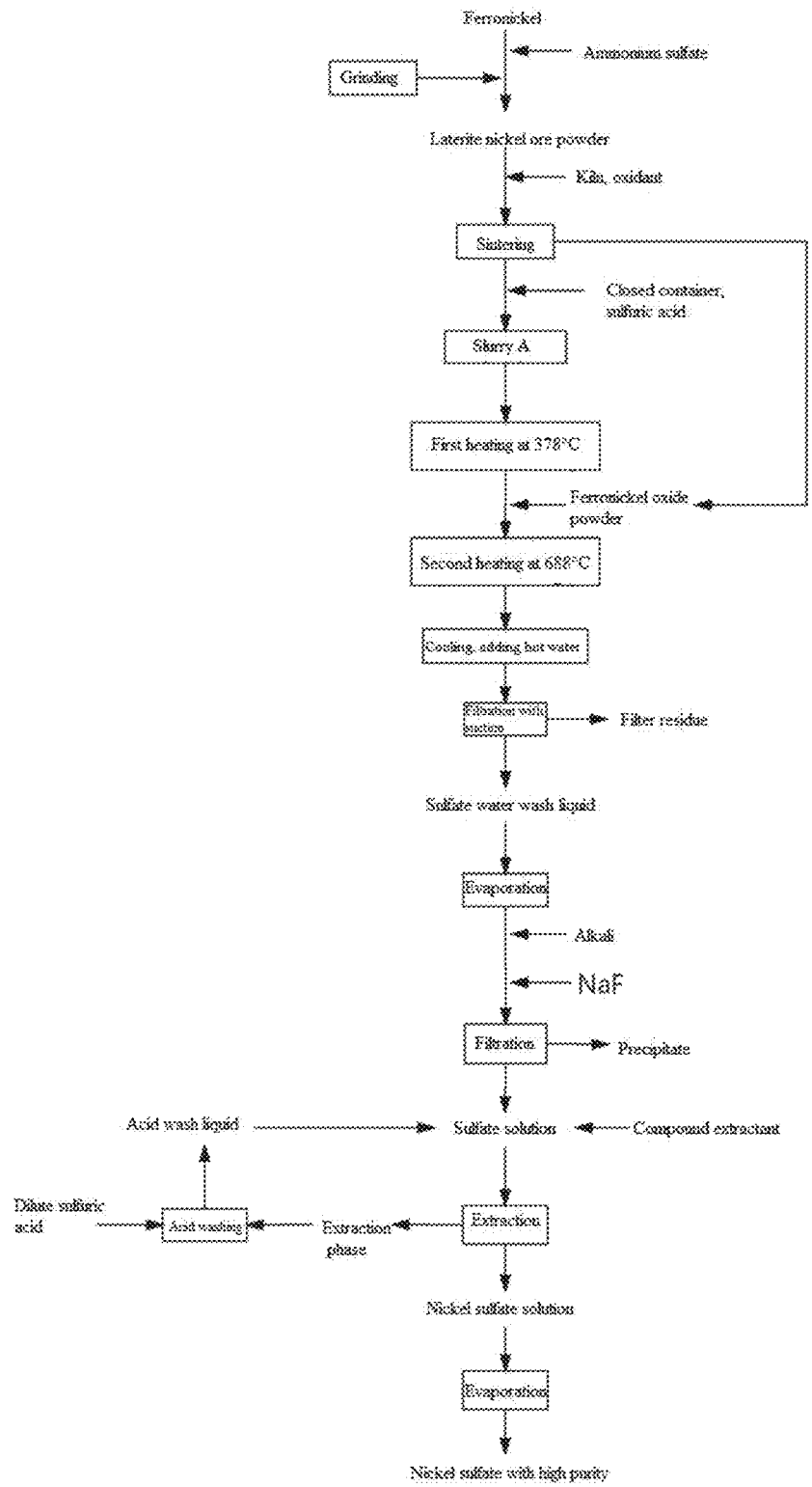
FIG. 1 is a flow chart of the preparation of nickel sulfate in Example 1.
Figure 2:
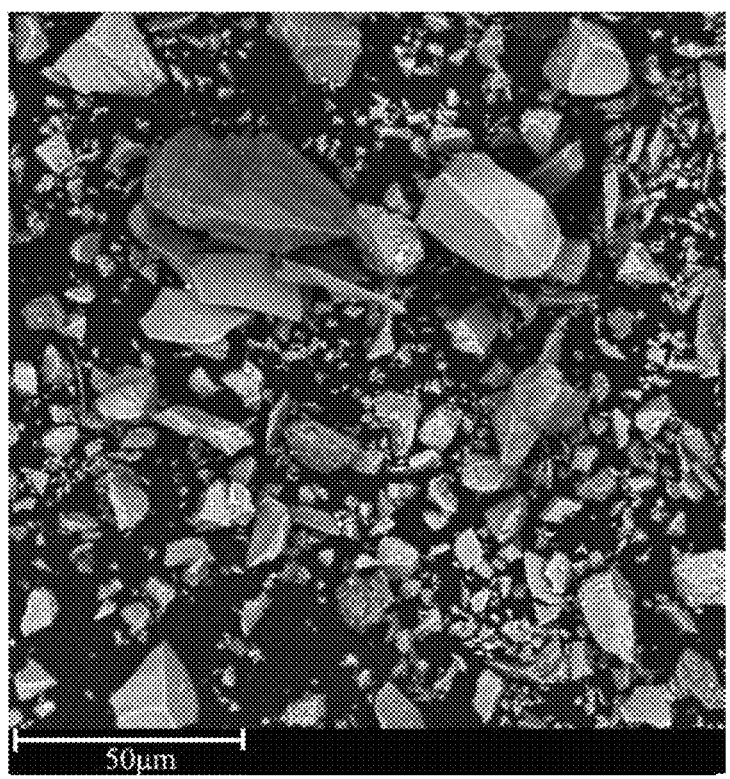
FIG. 2 is an SEM image of the ferronickel in Example 1.

Provided is a method for preparing nickel sulfate with high purity using low-nickel type ferronickel, comprising the following specific steps (see FIG. 1 for the specific process flow chart):

(1) Pretreatment of low-nickel type ferronickel: Ferronickel (coming from a laterite nickel ore company in Indonesia, and being subjected to analysis with an SEM image shown in FIG. 2) was crushed into large particles of ferronickel, which was then ground after adding ammonium sulfate (the mass ratio of ferronickel:ammonium sulfate is 100:0.5) to obtain ferronickel powder (particle size<150 μm). The ferronickel powder was placed in a kiln (pressure of 0.3 MPa), sintered and oxidized at 950° C. for 150 min with air introduced into the closed kiln for roasting at a rotational speed of 10 r/min. After the oxidation was completed, ferronickel oxide powder was obtained, and 1.50 kg ferronickel oxide powder was weighed out.

(2) Dissolution of ferronickel oxide powder: Part of the ferronickel oxide powder was put in a closed container and mixed with 5.45 mol/L sulfuric acid to obtain slurry A (the ratio of the mass of the ferronickel oxide powder to the volume of the acid was 1 kg: 5 L). The slurry A was subjected to a first heating at 378° C. with a stirring frequency of 420 rpm, and the time of the first heating was 26 min. Then the slurry A was heated to 688° C. for a second heating, and part of the ferronickel oxide powder was added again (the ratio of the mass of the ferronickel oxide powder to the volume of the acid was 450 kg: 650 L) to obtain slurry B, which was heated stably for 25 min, with stirring and extracting the gas in the process. After heating, the slurry B was cooled to 72° C., and then the slurry B was washed twice with 65° C. hot water to obtain a sulfate water wash liquid. The insoluble substance was waste residues (mainly $SiO_2$ and Fe oxides). The sulfate water wash liquid was mainly a salt solution including nickel sulfate, iron sulfate and magnesium sulfate.

In step (2), by high-temperature heating, the metal oxides were efficiently and selectively dissolved. Iron oxide underwent dehydration reaction in high temperature and high concentration sulfuric acid, and the ferronickel slurry was leached with hot water. Through (XRD) detection and analysis, only a small part (<10%) of iron oxide was selectively dissolved, and most of the iron oxide would not be washed out with water. Therefore, the workload of subsequent iron removal can be reduced, and the efficiency of impurity removal can be improved. Accordingly, the purity of nickel after impurity removal was increased. Other metal (Mg, Co, Ca, etc.) oxides were dissolved by adding hot water and acid to become a sulfate solution.

The above effect can be explained by the following reaction process (1)-(3):

$$Fe_2(SO_4)_3 + H_2O \rightarrow 2Fe(OH)SO_4 + SO_3 \quad (1),$$

$$2Fe(OH)SO_4 \rightarrow 2Fe_2O(SO_4)_2 + H_2O \quad (2)$$

$$Fe_2O(SO_4)_2 \rightarrow Fe_2O_3 + 2SO_3 \quad (3).,$$

(3) Part of the water in the sulfate water wash liquid was evaporated until the water content in the sulfate solution obtained by dissolving 100 g of ferronickel powder was 280 ml. Then 6.30 mol/L NaOH solution was added to the sulfate water wash liquid to adjust the pH to 4.71. Then NaF (according to the molar ratio of (Ca+Mg):NaF of 1:1.2) was added to form a precipitate, and filtration was performed to remove the precipitate (mainly calcium fluoride, magnesium fluoride, etc.) to obtain a filtrate.

(4) 0.75 mol/L sulfuric acid was added to the filtrate to adjust the pH to 2.86, and a compound extractant (the volume ratio of the compound extractant to the filtrate was 0.8:1.2, and the synthesis process of the compound extractant was: sodium dodecyl sulfate, bis(2,4,4-trimethylpentyl) dithiophosphonic acid, tributyl phosphate, and sulfonated kerosene were mixed in a volume ratio of 2.5:7.5:2:70, and 6.30 mol/L NaOH solution was added, until the saponification rate reached 45% and the saponification lasted 35 min.) was added for extraction. The extraction was controlled for 5 min to obtain a raffinate phase and 5.4 L of a nickel-loaded organic phase. The nickel-loaded organic phase was subjected to back-extraction to extract nickel with 5.4 L of 0.75 mol/L sulfuric acid (the volume ratio of nickel-loaded organic phase:the sulfuric acid was 1:1) to prepare a nickel sulfate solution. The nickel sulfate solution was evaporated to obtain nickel sulfate. The raffinate phase was washed out with 0.05 mol/L dilute sulfuric acid to obtain an acid wash liquid, which was mixed with the precipitate-removed filtrate for a second extraction.

Example 2

Provided is a method for preparing nickel sulfate with high purity using low-nickel type ferronickel, comprising the following specific steps:

(1) Pretreatment of low-nickel type ferronickel: Ferronickel was crushed into large particles of ferronickel, which was then ground after adding ammonium sulfate (ferronickel: ammonium sulfate=100:0.8) to obtain ferronickel powder (particle size<150 μm). The ferronickel powder was placed in a kiln (pressure of 0.3 MPa), sintered and oxidized at 950° C. for 155 min with air introduced into the closed kiln for roasting at a rotational speed of 10 r/min. After the oxidation was completed, ferronickel oxide powder was obtained, and 1.50 kg ferronickel oxide powder was weighed out.

(2) Dissolution of ferronickel oxide powder: Part of the ferronickel oxide powder was put in a closed container and mixed with 5.45 mol/L sulfuric acid to obtain slurry A (the ratio of the mass of the ferronickel oxide powder to the volume of the acid was 10 kg: 74 L). The slurry A was subjected to a first heating at 365° C. with a stirring frequency of 420 rpm, and the time of the first heating was 32 min. Then the slurry A was heated to 724° C. for a second heating, and part of the ferronickel oxide powder was added again (the ratio of the mass of the ferronickel oxide powder to the volume of the acid was 460 kg: 700 L) to obtain slurry B, which was heated stably for 32 min, with stirring and extracting the gas in the process. After heating, the slurry B was cooled to 86° C., and then the slurry B was washed twice with 78° C. hot water to obtain a sulfate water wash liquid. The insoluble substance was waste residues (mainly SiO$_2$ and Fe oxides). The sulfate water wash liquid was mainly a salt solution including nickel sulfate, iron sulfate and magnesium sulfate.

(3) Part of the water in the sulfate water wash liquid was evaporated until the water content in the sulfate solution obtained by dissolving 100 g of ferronickel powder was 275 ml. Then 7.23 mol/L NaOH solution was added to the sulfate water wash liquid to adjust the pH to 4.83. Then NaF (according to the molar ratio of (Ca+Mg):NaF of 1:1.42) was added to form a precipitate, and filtration was performed to remove the precipitate (mainly calcium fluoride, magnesium fluoride, etc.) to obtain a filtrate.

(4) Sulfuric acid was added to the filtrate to adjust the pH to 3.21, and a compound extractant (the volume ratio of the compound extractant to the filtrate was 1.5:1.0 for mixing, and the synthesis process of the compound extractant was: sodium dodecyl sulfate, bis(2,4,4-trimethylpentyl) dithiophosphonic acid, tributyl phosphate, and sulfonated kerosene were mixed in a volume ratio of 5.5:7.5:3:70, and 6.30 mol/L NaOH solution was added, until the saponification rate reached 42% and the saponification lasted 35 min.) was added for extraction. The extraction was controlled for 5 min to obtain a raffinate phase and 5.4 L of a nickel-loaded organic phase. The nickel-loaded organic phase was subjected to back-extraction to extract nickel with 5.4 L of 0.75 mol/L sulfuric acid (the volume ratio of nickel-loaded organic phase:the sulfuric acid was 1:1) to prepare a nickel sulfate solution. The nickel sulfate solution was evaporated to obtain nickel sulfate. The raffinate phase was washed out with 0.05 mol/L dilute sulfuric acid to obtain an acid wash liquid, which was mixed with the precipitate-removed filtrate for a second extraction.

Example 3

Provided is a method for preparing nickel sulfate with high purity using low-nickel type ferronickel, comprising the following specific steps:

(1) Pretreatment of low-nickel type ferronickel: Ferronickel was crushed into large particles of ferronickel, which was then ground after adding ammonium sulfate (ferronickel:ammonium sulfate=100:0.8) to obtain ferronickel powder (particle size<150 μm). The ferronickel powder was placed in a kiln (pressure of 0.3 MPa), sintered and oxidized at 860° C. for 160 min with air introduced into the closed kiln for roasting at a rotational speed of 10 r/min. After the oxidation was completed, ferronickel oxide powder was obtained, and 1.50 kg ferronickel oxide powder was weighed out.

(2) Dissolution of ferronickel oxide powder: Part of the ferronickel oxide powder was put in a closed container and mixed with 5.45 mol/L sulfuric acid to obtain slurry A (the ratio of the mass of the ferronickel oxide powder to the volume of the acid was 10 kg: 75 L). The slurry A was subjected to a first heating at 420° C. with a stirring frequency of 420 rpm, and the time of the first heating was 35 min. Then the slurry A was heated to 754° C. for a second heating, and part of the ferronickel oxide powder was added again (the ratio of the mass of the ferronickel oxide powder to the volume of the acid was 450 kg: 650 L) to obtain slurry B, which was heated stably for 36 min, with stirring and extracting the gas in the process. After heating, the slurry B was cooled to 90° C., and then the slurry B was washed twice with 78° C. hot water to obtain a sulfate water wash liquid. The insoluble was waste residues (mainly SiO$_2$ and Fe oxides). The sulfate water wash liquid was mainly a salt solution including nickel sulfate, iron sulfate and magnesium sulfate.

(3) Part of the water in the sulfate water wash liquid was evaporated until the water content in the sulfate solution obtained by dissolving 100 g of ferronickel powder was 294 ml. Then 7.58 mol/L NaOH solution was added to the sulfate water wash liquid to adjust the pH to 5.23. Then NaF (according to the molar ratio of (Ca+Mg):NaF of 1:1.5) was added to form a precipitate, and filtration was performed to remove the precipitate (mainly calcium fluoride, magnesium fluoride, etc.) to obtain a filtrate.

(4) 0.75 mol/L sulfuric acid was added to the filtrate to adjust the pH to 3.04, and a compound extractant (the volume ratio of the compound extractant to the filtrate was 1.5:1.2, and the synthesis process of the compound extractant was: sodium dodecyl sulfate, bis(2,4,4-trimethylpentyl) dithiophosphonic acid, tributyl phosphate, and sulfonated kerosene were mixed in a volume ratio of 8:6:5:65, and 6.30 mol/L NaOH solution was added, until the saponification rate reached 45% and the saponification lasted 36 min.) was added for extraction. The extraction was controlled for 5 min to obtain a raffinate phase and 5.2 L of a nickel-loaded organic phase. The nickel-loaded organic phase was subjected to back-extraction to extract nickel with 5.2 L of 0.75 mol/L sulfuric acid (the volume ratio of nickel-loaded organic phase:the sulfuric acid was 1:1) to prepare a nickel sulfate solution. The nickel sulfate solution was evaporated to obtain nickel sulfate. The raffinate phase was washed out with 0.05 mol/L dilute sulfuric acid to obtain an acid wash liquid, which was mixed with the precipitate-removed filtrate for a second extraction.

Example 4

Provided is a method for preparing nickel sulfate with high purity using low-nickel type ferronickel, comprising the following specific steps:

(1) Pretreatment of low-nickel type ferronickel: Ferronickel was crushed into large particles of ferronickel, which was then ground after adding ammonium sulfate (ferronickel:ammonium sulfate=100:1.2) to obtain ferronickel powder (particle size<150 μm). The ferronickel powder was placed in a kiln (pressure of 0.3 MPa), sintered and oxidized at 960° C. for 150 min with oxygen introduced into the closed kiln for roasting at a rotational speed of 10 r/min. After the oxidation was completed, ferronickel oxide powder was obtained, and 1.50 kg ferronickel oxide powder was weighed out.

(2) Dissolution of ferronickel oxide powder: Part of the ferronickel oxide powder was put in a closed container and mixed with 6.86 mol/L sulfuric acid to obtain slurry A (the ratio of the mass of the ferronickel oxide powder to the volume of the acid was 100 kg: 740 L). The slurry A was subjected to a first heating at 350° C. with a stirring frequency of 420 rpm, and the time of the first heating was 32 min. Then the slurry A was heated to 780° C. for a second heating, and part of the ferronickel oxide powder was added again (the ratio of the mass of the ferronickel oxide powder to the volume of the acid was 480 kg: 700 L) to obtain slurry B, which was heated stably for 32 min, with stirring and extracting the gas in the process. After heating, the slurry B was cooled to 80° C., and then the slurry B was washed twice with 85° C. hot water to obtain a sulfate water wash liquid. The insoluble was waste residues (mainly $SiO_2$ and Fe oxides). The sulfate water wash liquid was mainly a salt solution including nickel sulfate, iron sulfate and magnesium sulfate.

(3) Part of the water in the sulfate water wash liquid was evaporated until the water content in the sulfate solution obtained by dissolving 100 g of ferronickel powder was 275 ml. Then 7.23 mol/L NaOH solution was added to the sulfate water wash liquid to adjust the pH to 4.83. Then NaF (according to the molar ratio of (Ca+Mg):NaF of 1:1.42) was added to form a precipitate, and filtration was performed to remove the precipitate (mainly calcium fluoride, magnesium fluoride, etc.) to obtain a filtrate.

(4) 0.75 mol/L sulfuric acid was added to the filtrate to adjust the pH to 2.75, and a compound extractant (the volume ratio of the compound extractant to the filtrate was 1.2:1.0, and the synthesis process of the extractant was: sodium dodecyl sulfate, bis(2,4,4-trimethylpentyl) dithiophosphonic acid, tributyl phosphate, and sulfonated kerosene were mixed in a volume ratio of 3:15:6:80, and 6.30 mol/L NaOH solution was added, until the saponification rate reached 40% and the saponification lasted 35 min.) was added for extraction. The extraction was controlled for 5 min to obtain a raffinate phase and 5.6 L of a nickel-loaded organic phase. The nickel-loaded organic phase was subjected to back-extraction to extract nickel with 5.6 L of 0.75 mol/L sulfuric acid (the volume ratio of nickel-loaded organic phase:the sulfuric acid was 1:1) to prepare a nickel sulfate solution. The nickel sulfate solution was evaporated to obtain nickel sulfate. The raffinate phase was washed out with 0.05 mol/L dilute sulfuric acid to obtain an acid wash liquid, which was mixed with the precipitate-removed filtrate for a second extraction.

Example 5

Provided is a method for preparing nickel sulfate with high purity using low-nickel type ferronickel, comprising the following specific steps:

(1) Pretreatment of low-nickel type ferronickel: Ferronickel was crushed into large particles of ferronickel, which was then ground to obtain ferronickel powder (particle size<150 μm). The ferronickel powder was placed in a kiln (pressure of 0.3 MPa), sintered and oxidized at 950° C. for 155 min with air introduced into the closed kiln for roasting at a rotational speed of 10 r/min. After the oxidation was completed, ferronickel oxide powder was obtained, and 1.50 kg ferronickel oxide powder was weighed out.

(2) Dissolution of ferronickel oxide powder: Part of the ferronickel oxide powder was put in a closed container and mixed with 5.45 mol/L sulfuric acid to obtain slurry A (the ratio of the mass of the ferronickel oxide powder to the volume of the acid was 10 kg: 74 L). The slurry A was subjected to a first heating at 365° C. with a stirring frequency of 420 rpm, and the time of the first heating was 32 min. Then the slurry A was heated to 724° C. for a second heating, and part of the ferronickel oxide powder was added again (the ratio of the mass of the ferronickel oxide powder to the volume of the acid was 460 kg: 655 L) to obtain slurry B, which was heated stably for 32 min, with stirring and extracting the gas in the process. After heating, the slurry B was cooled to 86° C., and then the slurry B was washed twice with 78° C. hot water to obtain a sulfate water wash liquid. The insoluble was waste residues (mainly $SiO_2$ and Fe oxides). The sulfate water wash liquid was mainly a salt solution including nickel sulfate, iron sulfate and magnesium sulfate.

(3) Part of the water in the sulfate water wash liquid was evaporated until the water content in the sulfate solution obtained by dissolving 100 g of ferronickel powder was 275 ml. Then 7.23 mol/L NaOH solution was added to the sulfate water wash liquid to adjust the pH to 4.83. Then NaF (according to the molar ratio of (Ca+Mg):NaF of 1:1.42) was added to form a precipitate, and filtration was performed to remove the precipitate (mainly calcium fluoride, magnesium fluoride, etc.) to obtain a filtrate.

(4) Sulfuric acid was added to the filtrate to adjust the pH to 3.21, and a compound extractant (the volume ratio of the compound extractant to the filtrate was 1.5:1.0 for mixing, and the synthesis process of the compound extractant was: sodium dodecyl sulfate, bis(2,4,4-trimethylpentyl) dithiophosphonic acid, tributyl phosphate, and sulfonated kerosene were mixed in a volume ratio of 5.5:7.5:3:70, and 6.30 mol/L NaOH solution was added, until the saponification rate reached 42% and the saponification lasted 35 min.) was added for extraction. The extraction was controlled for 5 min to obtain a raffinate phase and 5.4 L of a nickel-loaded organic phase. The nickel-loaded organic phase was subjected to back-extraction to extract nickel with 5.4 L of 0.75 mol/L sulfuric acid (the volume ratio of nickel-loaded organic phase:the sulfuric acid was 1:1) to prepare a nickel sulfate solution. The nickel sulfate solution was evaporated to obtain nickel sulfate. The raffinate phase was washed out with 0.05 mol/L dilute sulfuric acid to obtain an acid wash liquid, which was mixed with the above precipitate-removed filtrate for a second extraction.

Example 6

Provided is a method for preparing nickel sulfate with high purity using low-nickel type ferronickel, comprising the following specific steps:

(1) Pretreatment of low-nickel type ferronickel: Ferronickel was crushed into large particles of ferronickel, which was then ground after adding ammonium sulfate (ferronickel:ammonium sulfate=100:0.8) to obtain ferronickel powder (particle size<150 μm). The ferronickel powder was placed in a kiln (pressure of 0.3 MPa), sintered and oxidized at 950° C. for 55 min with air introduced into the closed kiln for roasting at a rotational speed of 10 r/min. After the oxidation was completed, ferronickel oxide powder was obtained, and 1.50 kg ferronickel oxide powder was weighed out.

(2) Dissolution of ferronickel oxide powder: Part of the ferronickel oxide powder was put in a closed container and mixed with 5.45 mol/L sulfuric acid to obtain slurry A (the ratio of the ferronickel oxide powder to the volume of the acid was 10 kg: 74 L). The slurry A was subjected to heating at 365° C. with a stirring frequency of 420 rpm, and the time of the heating was 32 min. Then part of the ferronickel oxide powder was added again (the ratio of the mass of the ferronickel oxide powder to the volume of the acid was 460 kg: 655 L) to obtain slurry B, which was heated at 365° C. for 32 min, with stirring and extracting the gas in the process.

After heating, the slurry B was cooled to 86° C., and then the slurry B was washed twice with 78° C. hot water to obtain a sulfate water wash liquid. The insoluble was waste residues (mainly $SiO_2$ and Fe oxides). The sulfate water wash liquid was mainly a salt solution including nickel sulfate, iron sulfate and magnesium sulfate.

(3) Part of the water in the sulfate water wash liquid was evaporated until the water content in the sulfate solution obtained by dissolving 100 g of ferronickel powder was 275 ml. Then 7.23 mol/L NaOH solution was added to the sulfate water wash liquid to adjust the pH to 4.83. Then NaF (according to the molar ratio of (Ca+Mg):NaF of 1:1.42) was added to form a precipitate, and filtration was performed to remove the precipitate (mainly calcium fluoride, magnesium fluoride, etc.) to obtain a filtrate.

(4) Sulfuric acid was added to the filtrate to adjust the pH to 3.21, and a compound extractant (the volume ratio of the compound extractant to the filtrate was 1.5:1.0 for mixing, and the synthesis process of the compound extractant was: sodium dodecyl sulfate, bis(2,4,4-trimethylpentyl) dithiophosphonic acid, tributyl phosphate, and sulfonated kerosene were mixed in a volume ratio of 5.5:7.5:3:70, and 6.30 mol/L NaOH solution was added, until the saponification rate reached 42% and the saponification lasted 35 min.) was added for extraction. The extraction was controlled for 5 min to obtain a raffinate phase and 5.4 L of a nickel-loaded organic phase. The nickel-loaded organic phase was subjected to back-extraction to extract nickel with 5.4 L of 0.75 mol/L sulfuric acid (the volume ratio of nickel-loaded organic phase:the sulfuric acid was 1:1) to prepare a nickel sulfate solution. The nickel sulfate solution was evaporated to obtain nickel sulfate. The raffinate phase was washed out with 0.05 mol/L dilute sulfuric acid to obtain an acid wash liquid, which was mixed with the above precipitate-removed filtrate for a second extraction.

Example 7

Provided is a method for preparing nickel sulfate with high purity using low-nickel type ferronickel, comprising the following specific steps:

(1) Pretreatment of low-nickel type ferronickel: Ferronickel was crushed into large particles of ferronickel, which was then ground after adding ammonium sulfate (ferronickel:ammonium sulfate=100:0.8) to obtain ferronickel powder (particle size<150 μm). The ferronickel powder was placed in a kiln (pressure of 0.3 MPa), sintered and oxidized at 950° C. for 155 min with air introduced into the closed kiln for roasting at a rotational speed of 10 r/min. After the oxidation was completed, ferronickel oxide powder was obtained, and 1.50 kg ferronickel oxide powder was weighed out.

(2) Dissolution of ferronickel oxide powder: Part of the ferronickel oxide powder was put in a closed container and mixed with 5.45 mol/L sulfuric acid to obtain slurry A (the ratio of the mass of the ferronickel oxide powder to the volume of the acid was 10 kg: 74 L). The slurry A was subjected to a first heating at 365° C. with a stirring frequency of 420 rpm, and the time of the first heating was 32 min. Then the slurry A was heated to 724° C. for a second heating, and part of the ferronickel oxide powder was added again (the ratio of the mass of the ferronickel oxide powder to the volume of the acid was 460 kg: 655 L) to obtain slurry B, which was heated stably for 32 min, with stirring and extracting the gas in the process. After heating, the slurry B was cooled to 86° C., and then the slurry B was washed twice with 78° C. hot water to obtain a sulfate water wash liquid. The insoluble was waste residues (mainly $SiO_2$ and Fe oxides). The sulfate water wash liquid was mainly a salt solution including nickel sulfate, iron sulfate and magnesium sulfate.

(3) Part of the water in the sulfate water wash liquid was evaporated until the water content in the sulfate solution obtained by dissolving 100 g of ferronickel powder was 275 ml. Then 7.23 mol/L NaOH solution was added to the sulfate water wash liquid to adjust the pH to 4.83. Then NaF (according to the molar ratio of (Ca+Mg):NaF of 1:1.42) was added to form a precipitate, and filtration was performed to remove the precipitate (mainly calcium fluoride, magnesium fluoride, etc.) to obtain a filtrate.

(4) Sulfuric acid was added to the filtrate to adjust the pH to 3.21, and a compound extractant (the volume ratio of the compound extractant to the filtrate was 1.5:1.0 for mixing, and the synthesis process of the compound extractant was: sodium dodecyl sulfate, bis(2,4,4-trimethylpentyl) dithiophosphonic acid, and sulfonated kerosene were mixed in a volume ratio of 7:9:70, and 6.30 mol/L NaOH solution was added, until the saponification rate reached 42% and the saponification lasted 35 min.) was added for extraction. The extraction was controlled for 5 min to obtain a raffinate phase and 5.4 L of a nickel-loaded organic phase. The nickel-loaded organic phase was subjected to back-extraction to extract nickel with 5.4 L of 0.75 mol/L sulfuric acid (the volume ratio of nickel-loaded organic phase:the sulfuric acid was 1:1) to prepare a nickel sulfate solution. The nickel sulfate solution was evaporated to obtain nickel sulfate. The raffinate phase was washed out with 0.05 mol/L dilute sulfuric acid to obtain an acid wash liquid, which was mixed with the above precipitate-removed filtrate for a second extraction.

Product Effect Test

The sulfate water wash liquid prepared in the process of Examples 1-7 and the final product nickel sulfate were analyzed for content, which mainly included Ni and other impurities Fe, Mg, Co, and Ca. The test results are shown in Table 1 and Table 2.

TABLE 1

Analytical results of the composition of the sulfate water wash liquid

| | Ni (%) | Fe (%) | Mg (%) | Co (%) | Ca (%) |
|---|---|---|---|---|---|
| Example 1 | 3.56 | 16.41 | 2.74 | 0.61 | 0.21 |
| Example 2 | 3.66 | 15.89 | 3.68 | 0.56 | 0.26 |
| Example 3 | 3.14 | 14.76 | 3.72 | 0.55 | 0.14 |
| Example 4 | 3.22 | 15.65 | 2.95 | 0.57 | 0.28 |
| Example 5 | 2.37 | 17.13 | 2.46 | 0.42 | 0.11 |
| Example 6 | 3.56 | 17.77 | 2.98 | 0.67 | 0.14 |
| Example 7 | 3.60 | 16.04 | 3.65 | 0.58 | 0.25 |

TABLE 2

Analytical results of the composition of the nickel sulfate product

|           | Ni (%) | Fe (%) | Mg (%) | Co (%) | Ca (%) |
|-----------|--------|--------|--------|--------|--------|
| Example 1 | 21.76  | 0.0038 | 0.0021 | 0.0028 | 0.0010 |
| Example 2 | 21.74  | 0.0022 | 0.0017 | 0.0021 | 0.0008 |
| Example 3 | 21.93  | 0.0025 | 0.0023 | 0.0018 | 0.0008 |
| Example 4 | 21.34  | 0.0020 | 0.0013 | 0.0031 | 0.0009 |
| Example 5 | 19.91  | 0.070  | 0.0027 | 0.0034 | 0.0015 |
| Example 6 | 19.73  | 0.011  | 0.0034 | 0.0041 | 0.0023 |
| Example 7 | 20.20  | 0.022  | 0.0045 | 0.0030 | 0.0032 |

It can be seen from Table 1 and Table 2 that the method provided by the present disclosure can prepare nickel sulfate with high purity using low-nickel type ferronickel, in which the content of Fe, Mg, Co, Ca and other impurities was small, especially the content of Fe impurities. It can be seen from Table 1 that the content of Fe in the low-nickel type ferronickel was very high, and the content of Fe in the sulfate water wash liquid was almost 5 times that of Ni. However, after processing by the method provided by the present disclosure, nickel sulfate with high purity can be prepared, and the content of Ni can reach 19.73%-21.34%.

The invention claimed is:

1. A method for preparing nickel sulfate using ferronickel, comprising the following steps:
    (1) grinding ferronickel to obtain ferronickel powder, and then sintering the ferronickel powder in the presence of an oxidant to prepare ferronickel oxide powder;
    (2) adding sulfuric acid to the ferronickel oxide powder prepared in step (1), mixing, heating, and washing with water to prepare a sulfate water wash liquid;
    (3) adding alkali to the sulfate water wash liquid prepared in step (2) to adjust the pH value, then adding fluoride salt to form a precipitate, performing filtration to remove the precipitate, and drying the filtrate to obtain nickel sulfate;
    wherein in step (3), before drying the filtrate, an extractant is added to perform extraction to obtain a raffinate phase and a nickel-loaded organic phase, and then the nickel-loaded organic phase is back-extracted by sulfuric acid to obtain nickel sulfate;
    the extractant comprises sodium dodecyl sulfate, bis(2,4,4-trimethylpentyl) dithiophosphonic acid, tributyl phosphate, and sulfonated kerosene;
    a volume ratio of sodium dodecyl sulfate, bis(2,4,4-trimethylpentyl) dithiophosphonic acid, tributyl phosphate, and sulfonated kerosene is (1-10):(5-20):(1-10):(60-90).

2. The method according to claim 1, wherein step (1) further comprises adding ammonium sulfate during the grinding.

3. The method according to claim 2, wherein a mass of the ammonium sulfate is 0.3%-2% of the mass of the ferronickel.

4. The method according to claim 1, wherein in step (1), a temperature of the sintering is 700-1100° C., and a time of the sintering is 60-200 min; the oxidant is selected from one of air, $O_2$ and $H_2O_2$.

5. The method according to claim 1, wherein the process of step (2) comprises: adding sulfuric acid to part of the ferronickel oxide powder prepared in step (1) and mixing them to obtain slurry A; then performing a first heating to the slurry A, adding part of the ferronickel oxide powder prepared in step (1) to the slurry A to obtain slurry B, performing a second heating and washing with water to obtain a sulfate water wash liquid.

6. The method according to claim 5, wherein in the slurry A, a ratio of mass of the ferronickel oxide powder to volume of the sulfuric acid is 1 kg:(4-15) L; and in the slurry B, a ratio of mass of the ferronickel oxide powder to volume of the sulfuric acid is 1 kg:(1-3) L.

7. The method according to claim 5, wherein a temperature of the first heating is 300-500° C., and a time of the first heating is 10-60 min; a temperature of the second heating is 600-800° C., and a time of the second heating is 10-60 min.

* * * * *